Figure 1:
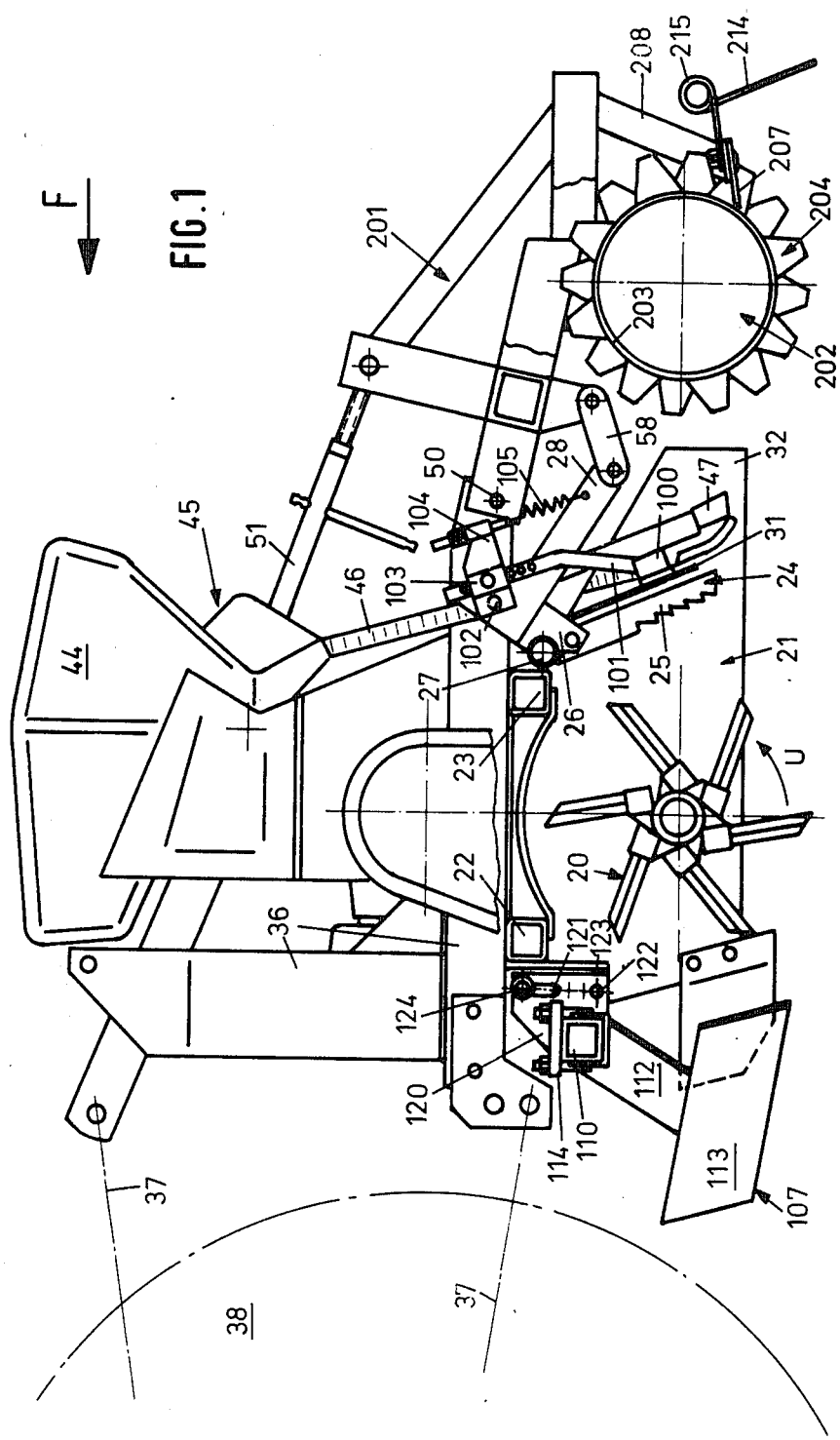

United States Patent [19]

Rau et al.

[11] Patent Number: 4,776,290

[45] Date of Patent: Oct. 11, 1988

[54] POWER TAKE-OFF SHAFT DRIVEN GROUND PREPARATION MACHINE

[75] Inventors: Willy Rau, Weilheim; Christian Taus, Kirchheim, both of Fed. Rep. of Germany

[73] Assignee: Maschinenfabrik Rau GmbH, Weilheim, Fed. Rep. of Germany

[21] Appl. No.: 232,848

[22] Filed: Feb. 9, 1981

[30] Foreign Application Priority Data

Feb. 8, 1980 [DE] Fed. Rep. of Germany ...... 3004577
May 29, 1980 [DE] Fed. Rep. of Germany ...... 3020397
Nov. 20, 1980 [DE] Fed. Rep. of Germany ... 8031009[U]

[51] Int. Cl.$^4$ .......................... A01C 7/00; A01B 9/00
[52] U.S. Cl. ...................................... 111/59; 172/68; 172/70; 172/119
[58] Field of Search .................. 172/63, 68, 70, 71, 172/547, 610, 676, 733, 119, 123, 713, 686, 540, 112, 762; 111/59, 52, 53, 60

[56] References Cited

U.S. PATENT DOCUMENTS

| | | | |
|---|---|---|---|
| 163,061 | 5/1875 | Fenley | 172/123 X |
| 525,426 | 9/1894 | Monroe | 37/142.50 X |
| 941,951 | 11/1909 | Reynolds | 172/676 X |
| 978,687 | 12/1910 | Blaine | 172/713 |
| 1,000,557 | 8/1911 | Shannon | 172/547 X |
| 1,085,508 | 1/1914 | Talbot et al. | 172/63 |
| 1,178,523 | 4/1916 | Latham et al. | 172/733 X |
| 1,601,542 | 9/1926 | Schermuly et al. | 172/686 X |
| 1,604,721 | 10/1926 | Riepe | 172/676 |
| 1,662,088 | 3/1928 | Von Raussendorff | 172/71 |
| 2,027,502 | 1/1936 | Weismuller | 172/540 X |
| 2,381,330 | 8/1945 | Ariens | 172/63 |
| 2,455,148 | 11/1948 | Traver | 172/68 |
| 2,617,340 | 11/1952 | Jones | 172/116 X |
| 3,347,188 | 10/1967 | Richey | 172/112 X |
| 3,557,879 | 1/1971 | Lely et al. | 172/123 X |
| 3,557,880 | 1/1971 | Lely et al. | 172/123 X |
| 3,970,012 | 7/1976 | Jones, Sr. | 172/112 X |
| 4,046,201 | 9/1967 | Lely | 172/762 X |
| 4,057,110 | 11/1977 | Lely | 172/63 X |
| 4,088,083 | 5/1978 | Dail, Jr. et al. | 172/68 X |
| 4,113,024 | 9/1978 | Lely et al. | 172/68 X |
| 4,113,027 | 9/1978 | Lely | 172/70 |
| 4,151,883 | 5/1979 | Lely et al. | 172/63 X |
| 4,167,976 | 9/1979 | Lely | 172/762 X |
| 4,200,156 | 4/1980 | Lely et al. | 172/68 X |
| 4,258,635 | 3/1981 | Lutz et al. | 172/68 X |

FOREIGN PATENT DOCUMENTS

| | | | |
|---|---|---|---|
| 505927 | 6/1937 | France | 172/68 |
| 1158698 | 1/1958 | France | 172/71 |
| 2462240 | 6/1976 | Fed. Rep. of Germany | 172/547 |
| 2749114 | 5/1979 | Fed. Rep. of Germany | 172/70 |
| 567744 | 10/1957 | Italy | 172/68 |
| 173970 | 1/1961 | Sweden | 172/119 |
| 175323 | 9/1965 | U.S.S.R. | 172/676 |
| 1443 | of 1889 | United Kingdom | 172/68 |
| 753666 | 7/1956 | United Kingdom | 172/610 |

Primary Examiner—Paul E. Shapiro
Attorney, Agent, or Firm—Barnes & Thornburg

[57] ABSTRACT

A power take-off shaft driven combination machine for ground preparation which can be coupled to a tractor vehicle is equipped, with a view to a short, light and constructionally simple construction, with levelling tools 107 arranged directly behind the tractor vehicle 38 which level the wheel tracks left by the tractor vehicle 38, with a rotor-tiller 20 arranged between the levelling tools which is driven via the power take-off shaft in a direction of rotation U which sustains the direction of travel F and which throws the excavated earth against a movable rake 24 or against a flexibly arranged mat 31 and with a vertically adjustable crushing roller 202 arranged therebehind which has a peripherally at least substantially closed roller body 203 with peripherally directed rows of teeth 204 and scrapers 207 arranged between and spaced apart from the rows of teeth. Tyne elements 214 which resiliently engage in the ground are arranged on the scraper 204 behind the crushing roller 201 and break up the cakes of earth peeled from the crushing roller 202 by the scrapers 207.

15 Claims, 14 Drawing Sheets

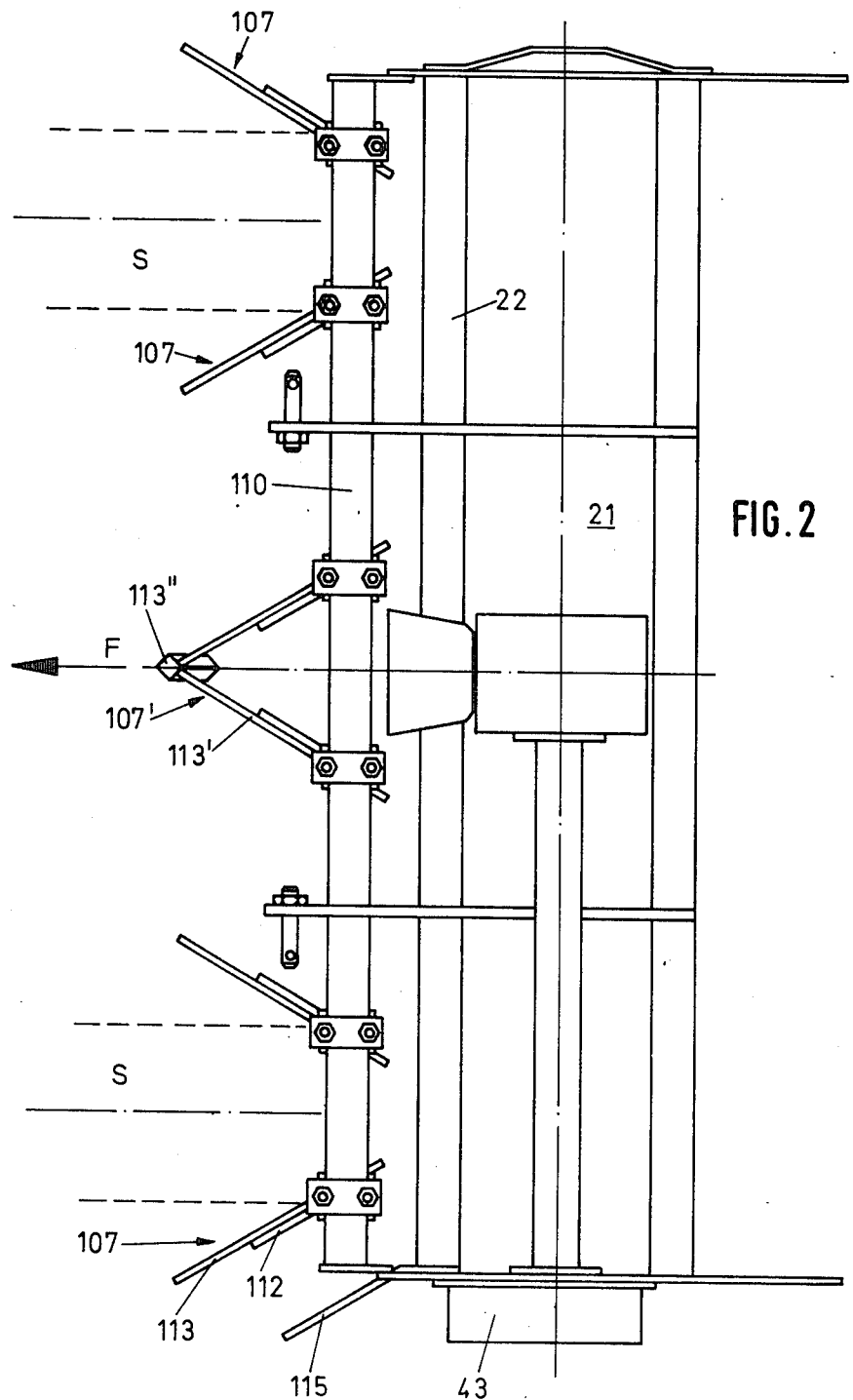

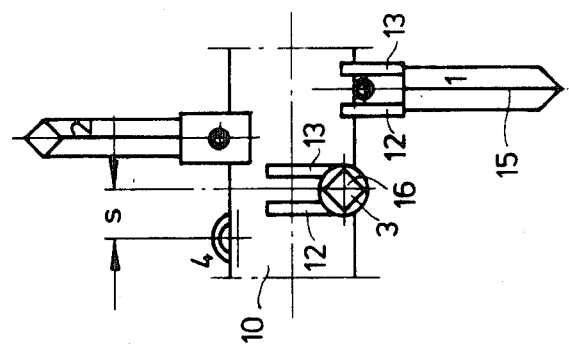

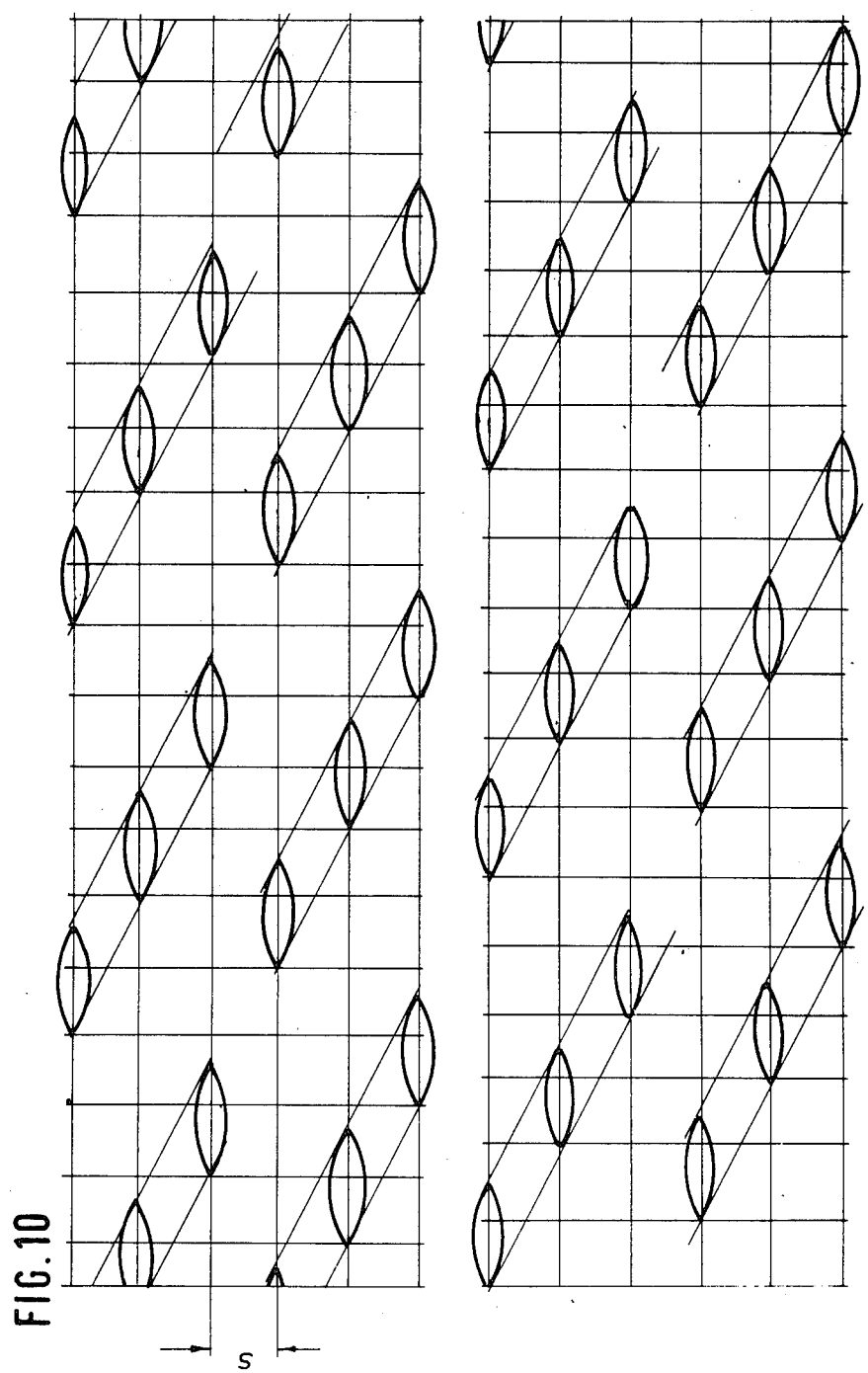

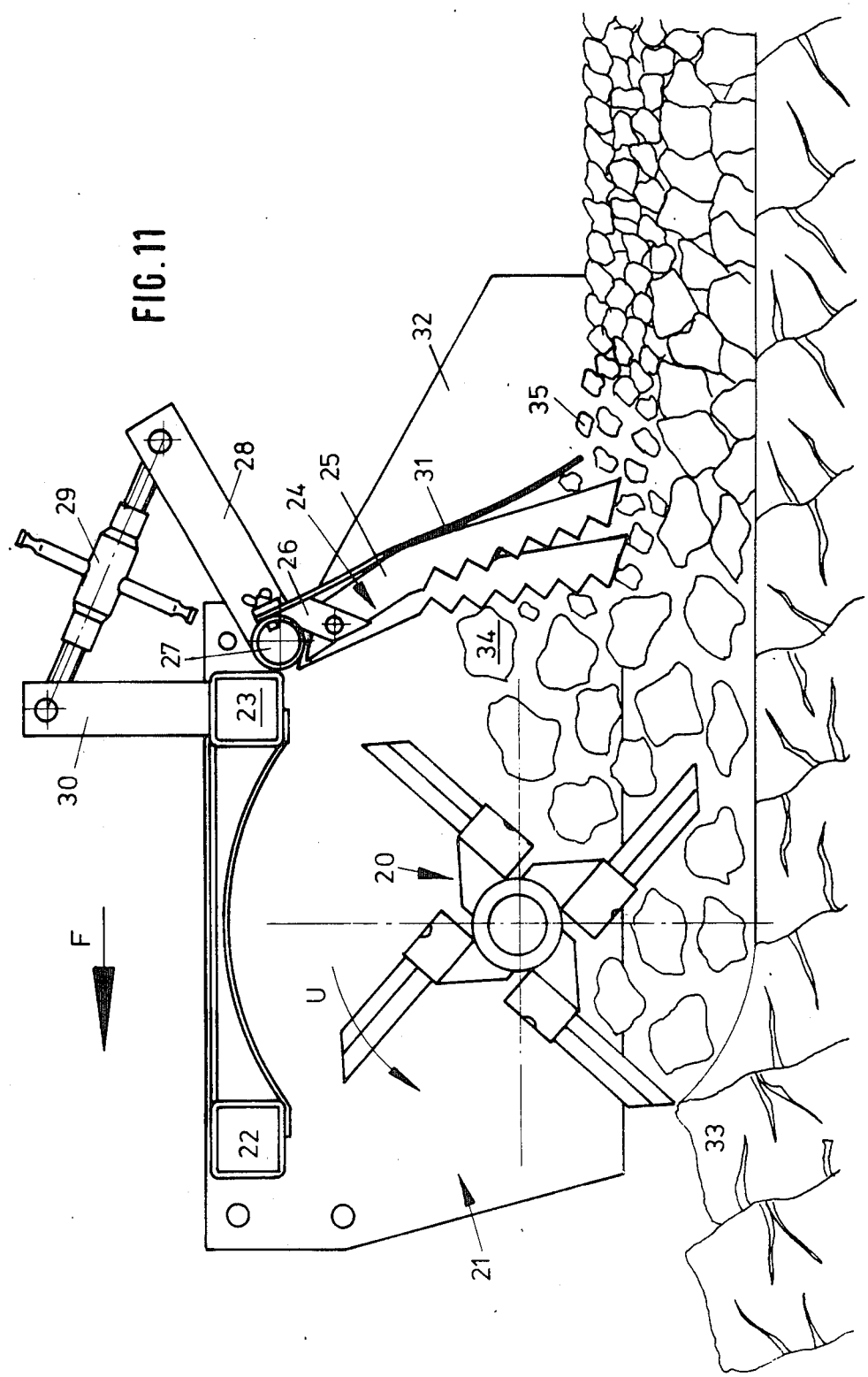

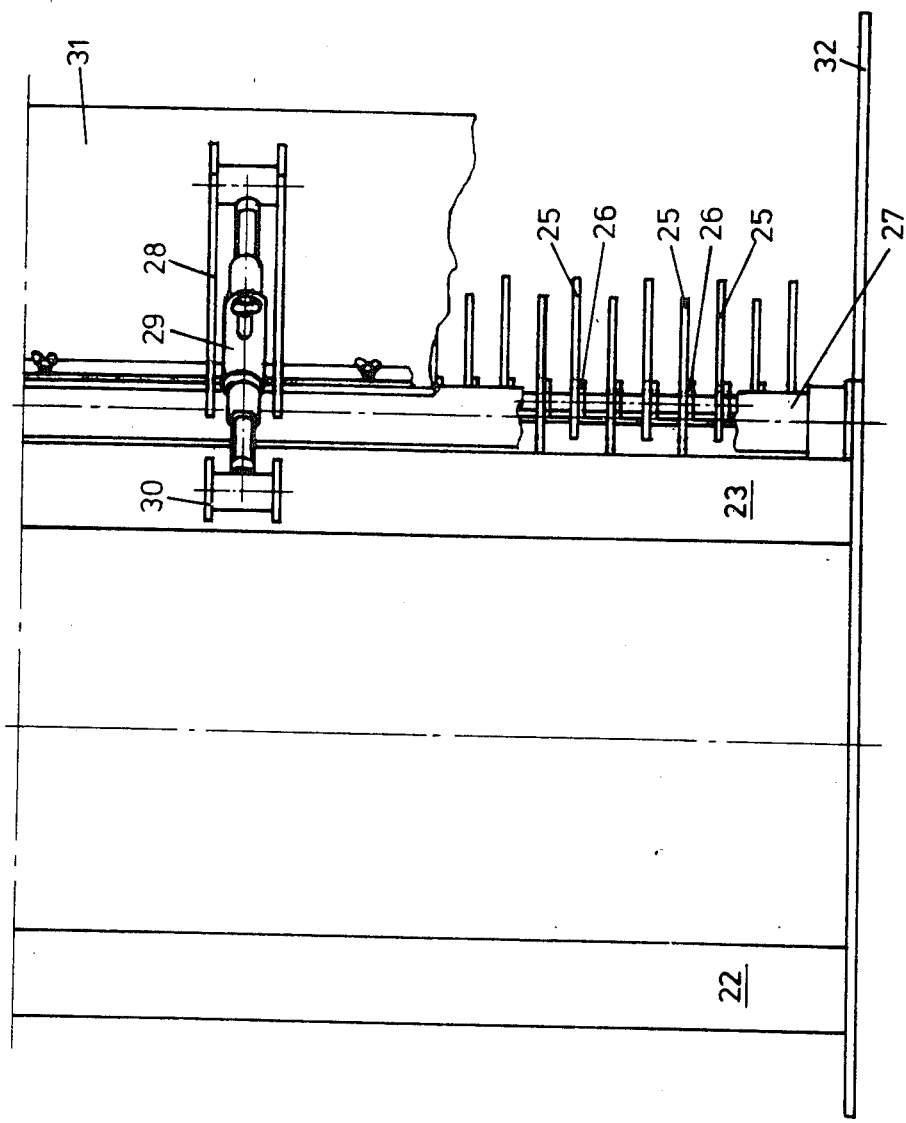

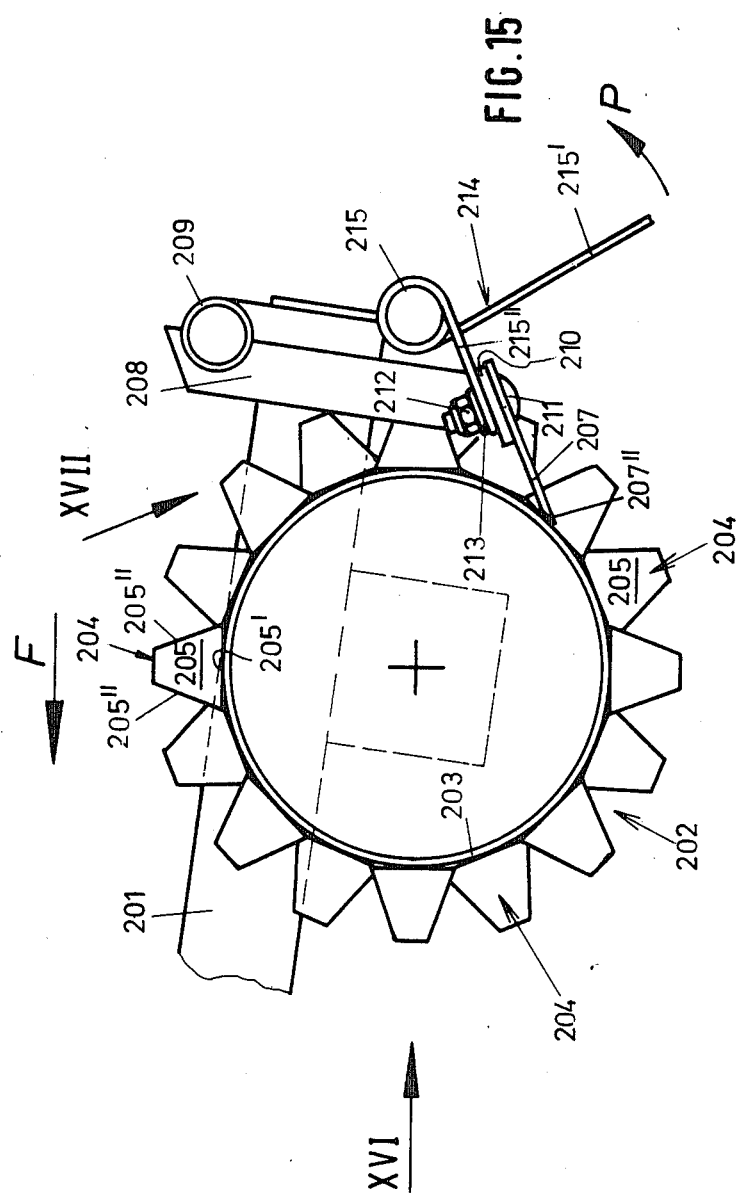

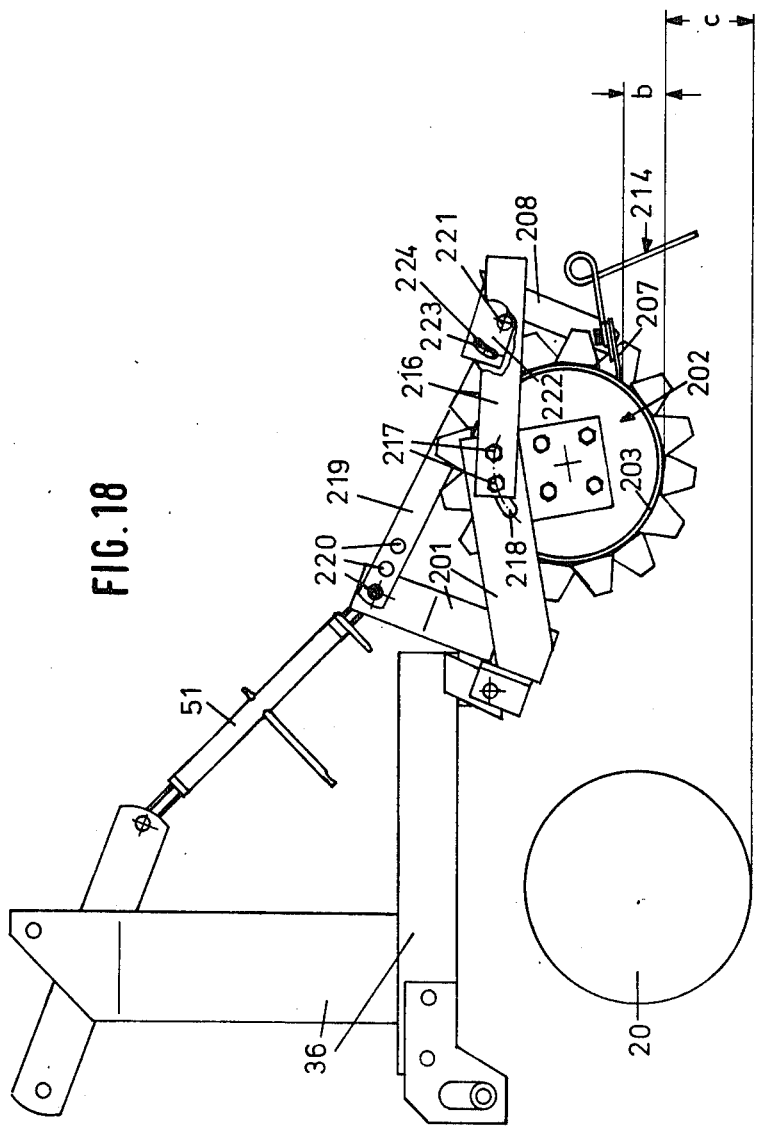

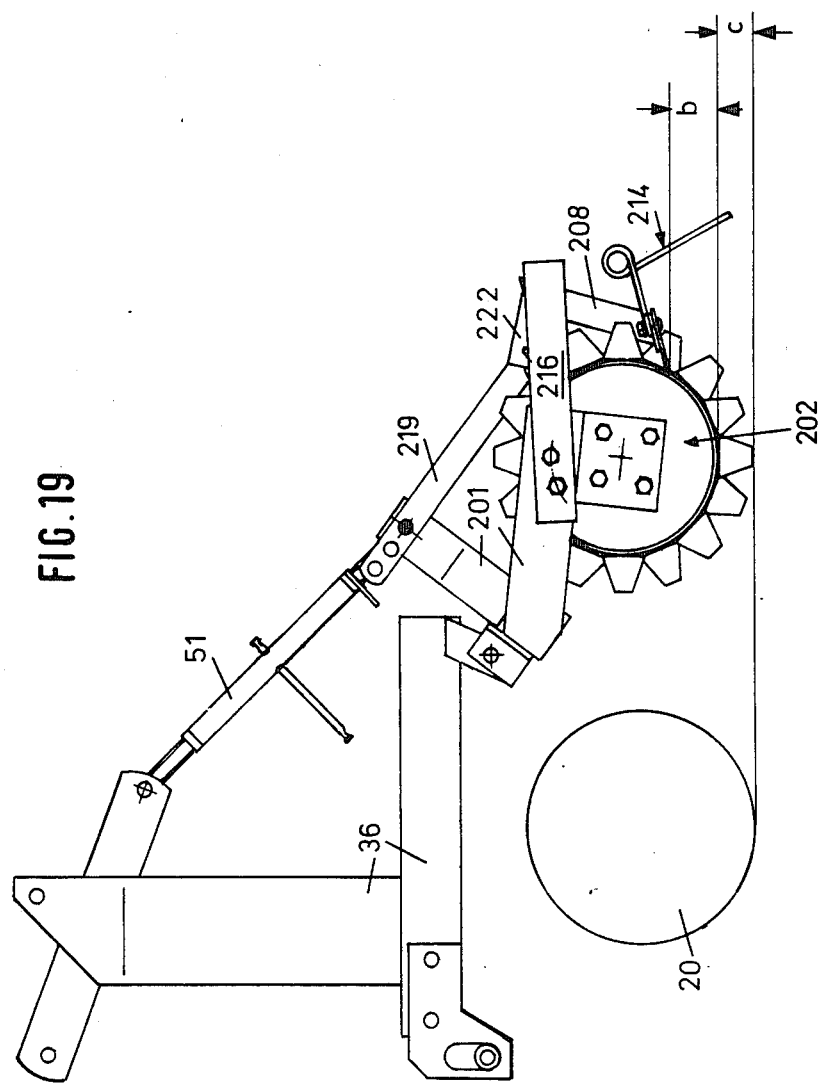

POWER TAKE-OFF SHAFT DRIVEN GROUND PREPARATION MACHINE

The invention relates to a power take-off shaft driven ground preparation machine which can be vertically adjustably coupled to a tractor vehicle which carries the ground preparation machine, in particular by means of a three point suspension, the ground preparation machine having various ground preparation tools arranged in combination on a frame.

Combination machines with several different tools arranged behind one another are known per se. The advantage of these machines resides in the fact that several working steps can be simultaneously executed during a single passage over the field to be worked so that considerable amounts of time can be saved. Previous machines were however generally extremely heavy and unmanageable because they had to be coupled to the tractor vehicle by means of a towing hitch so that turning manoeuvres in particular were extremely difficult to execute. In other respects the minimum power required by the tractor vehicle was considerable. To the extent that it was possible to directly couple combination machines, for example by means of a three point suspension, to the tractor vehicle to form a unit therewith, the operating result was often unsatisfactory particularly with regard to the considerable machine costs.

It is accordingly the object of the invention to provide a ground preparation machine which has a simple and cost effective construction, which is also light and short and which provides ideal operating results with relatively low requirements with regard to the drive power of the tractor vehicle. This object is satisfied for a ground preparation machine of the initially named kind in that levelling tools are exchangeably arranged forwardly on the frame directly behind the tractor vehicle on both sides of the wheel tracks left by the tractor vehicle and try to push earth into the wheel tracks; in that an exchangeable rotor-tiller, which can be driven by means of the power take-off shaft and which has a rotor transmission fixedly mounted on the frame, is arranged behind the levelling tools and can be driven in a direction of rotation which assists progress; in that a movable cover which directs the earth that is thrown upwardly by the rotor-tiller onto the ground surface is exchangeably arranged behind the rotor-tiller, and in that a crushing roller is exchangeably arranged therebehind by means of an auxiliary frame which can be vertically adjusted relative to the frame, with the crushing roller having a roller body which is at least substantially closed at its periphery and has rows of teeth aligned in the peripheral direction with scrapers arranged between and spaced from the rows of teeth, there being tyne elements which dig into the earth surface arranged behind the scrapers.

The ground preparation apparatus of the invention advantageously produces particularly good working results because good levelling, deep working of the ground and fine comminution of the earth surface that is left are achieved. The drive power required by the tractor vehcile is comparatively small because the operation of the rotor-tiller assists the propulsion of the vehicle and because the crushing roller has a low rolling resistance as a result of its closed surface, as a result of the tooth elements arranged in peripheral rows and also as a result of the scrapers which are arranged spaced from the tooth elements. The tool combination provided in accordance with the invention for the ground preparation machine allows a compact short construction and thus facilitates turning manoeuvres which can be carried out in the smallest space in accordance with the manoeuvreability of the tractor vehicle. The ground working tools that are provided can be made relatively light in weight and it is particularly advantageously that complicated drive transmissions are not required.

The levelling tools that are provided require only a small constructional length and are suitable, even for heavy or very wet ground, for levelling out the wheel tracks left by the vehicle. For this purpose levelling tools are usefully arranged on both sides of the wheel tracks. As a result of the T-shaped construction of the levelling tools which consist essentially of levelling plates centrally arranged on struts only low torques act on the struts relative to the strut axis so that on the whole a stiff mount for the levelling plates is obtained. Plate-like members which can be areally connected in simple manner with the levelling plates can be arranged to form the struts. If necessary the struts and levelling plates can consist of a common plate which is cut from a large thick sheet of metal.

By fastening the levelling tools to a transverse beam by means of shackles the lateral spacing of the levelling tools and also the number of the tools can be changed. A non-rotating connection between the transverse beam and the levelling tools is ensured if the shackles and the transverse beam have a polygonal and preferably approximately square profile; even if the shackles are only relatively loosely clamped.

By making the levelling tools vertically adjustable their peeling effect on the upper layers of earth can be adjusted.

The levelling plates are preferably somewhat rearwardly inclined relative to the horizontal plane so that they can slide away from very solid obstacles such as boulders or the like with simultaneous lifting of the ground preparation machine.

The rotor teeth, with their striker edges of wedge-like cross-section which point in the direction of rotation, divide the earth on penetrating the ground so that the earth slides away and is deposited on both sides of the tooth in question in the form of a wedge wave. The oppositely directed displacements or distorsions of the ground produced by neighbouring teeth in the axial direction of the rotor shaft result in the fragments of earth being effectively comminuted and obtaining a particularly uniformly loosened structure.

In order to form the striker edges the teeth can, in simple manner, have a rombic or preferably square cross-section, i.e. the teeth can take the form of a square section profile of sufficient thickness with a diagonal of the section being aligned approximately parallel to the direction of rotation of the teeth, so that one of the edges of the square section profile forms the striker edge.

In order to reduce the resistance of the earth to the teeth, the teeth can have outer end faces which extend at an acute angle to the striker edge substantially parallel to the rotor shaft. In this way sharp points are formed at the ends of the striker edges which facilitate the penetration of the teeth into the ground.

The teeth are preferably arranged with a radial spacing from the shaft axis so that, as seen in the direction of rotation of the teeth, the shat axis extends in front of the striker edge.

As a result of this arrangement an acute angle is included between the striker edge and a radial line extending from the center of the shaft to the outer end of the striker edge so that, on rotation of the rotor on the ground, the tooth also exerts a force in the direction towards the rotor shaft. The desired loosening of the prepared ground is favourably influenced in this way. The displaced arrangements of the teeth in the axial direction and in the peripheral direction of the rotor shaft as characterized in the claims make smooth running of the rotor-tiller possible and also ensures good accessibility of the teeth when these are exchanged. Exchangeability is favourably influenced by arranging the teeth in sockets arranged approximately tangential to the rotor shaft.

In order to break-up further the earth clod pieces thrown up by the rotor tiller a rake with blade-like rake tynes which are pivotally suspended, which yield to the resistance of the ground and which are loaded by means of a mat which at least partly covers the rearside of the rake tynes can be arranged as an impact surface behind the rotor. Under the impact of vertically thrown earth clod pieces, and also the resistance of the upper surface of the ground, the rake tynes deflect by different distances against the load of the mat depending on the prevailing local resistance so that earth pieces which may eventually become trapped between individual rake tynes are released by the relative movement between the rake tynes and thrown onto the earth surface. The tyned rake is thus self cleaning.

The cutting effect of the rake tynes can be increased by sawtooth-like front edges. In addition, or alternatively, the rake tynes can be displaced in zig-zag form relative to one another as seen in plan view so that earth fragments impinging on the rake tynes are particularly favourably guided along the rake tynes and cut up.

The range of pivotal movement of the rake tynes in the direction of travel can be limited by adjustable abutments which can if necessary be automatically adjusted during vertical adjustment of the subsequent crushing roller.

The tyned rake is particularly advantageous for dry ground. For moist ground it is in contrast sufficient if a semi-rigid impact surface which can locally yield under the impact of the earth pieces is arranged behind the rotor-tiller. As a result of this flexibility the earth mass adhering to the impact surface is torn into small pieces and thrown onto the surface of the ground. The seed outlets of a drilling device can be arranged behind the mat which loads the rake tynes or behind the semi-rigid impingement surface. A horizontally movable flexible strip is preferably used for this purpose. The flexible strip allows individual seed discharge mouth-pieces to deflect rearwardly in the longitudinal direction of the ground preparation machine however holds the lateral spacing between the seed discharge mouth-pieces substantially constant so that the seed is introduced into the ground in good parallel lines.

The mounting device for the seed discharge mouth-pieces can be loaded against the ground resistance in the direction of travel by means of a spring so that the mouth-pieces are pushed with additional force into the surface of the ground.

The crushing roller, which has rows of teeth aligned in the peripheral direction on a peripherally substantially closed roller body with spaces remaining between the teeth of the rows in the peripheral direction, is kept clean by scrapers which are arranged spaced apart from the rows of teeth. The scrapers thus work in each case only on a strip between the rows of teeth which is narrower than the spacing between the rows of teeth in the axial direction of the crushing roller. It has been shown that the remaining region between the rows of the teeth and the scrapers is effectively cleaned by the earth material on the surface of the roller which is contacted by the scraper being displaced partially sideways towards the rows of teeth. This sideways displacement, which is favoured by the openings between the tooth elements, results in the earth material which adheres to the roller surface and which is not directly contacted by the scrapers also being loosened and thrown from the roller surface.

To the extent that the earth material which is directly contacted by the scrapers is moist and sticky, such as clay soils, it is peeled from the roller surface by the scrapers in relatively large cakes and is thrown onto the surface of the ground in the form of clods. The tyne elements which, in accordance with the invention, dig in to the surface of the ground behind the scrapers serve to comminute these clod pieces.

The earth surface left behind the crushing roller has a particularly uniform pattern with homogenous and low crumb size. It should in particular be emphasized that even with more solid ground it is not possible to recognize tracks left by either the tyne elements or the rows of teeth.

The towing forces required for the crushing (or crum) roller are comparatively small because the rows of teeth, when compared with previous rollers, can be at least twice as far apart (as seen in the axial direction of the roller) and because the scrapers do not directly contact the rows of teeth so that, on the one hand, the frictional resistances which were produced with previous rollers by the friction of the scrapers on the tooth rows do not arise and, on the other hand, the rolling resistance of the roller is drastically reduced as a result of the reduced number of tooth elements.

The scrapers preferably contact the roller surface below the horizontal central plane as seen in the axial direction of the roller so that even with a small inclination of the scrapers relative to the horizontal plane an acute angle of incidence is achieved between the roller surface and the scrapers so that a good peeling effect of the scrapers is achieved with a low resistance. In other respects it has surprisingly turned out to be advantageous if the earth peeled away by the scrapers is thrown from a low height onto the earth surface so that the peeled away cakes of earth still have a relatively solid composition and are first torn into fine crumbs by the tyne elements.

A permanent flutter movement of the ends of the tyne elements which engage in the ground is achieved through the resilient arrangement of the tyne elements. This leads to a particularly uniform communition of the earth material.

For very sandy ground the use of tyne elements can in general be dispensed with. It is therefore advantageous if the tyne elements are exchangeably fastened, for example to the scrapers, with the fastening means which serve to directly or indirectly secure the scrapers to the roller frame, in particular nuts and bolts, serving at the same time to secure the tyne elements.

It is particularly advantageous, in conjunction with scrapers which are arranged spaced from the tooth elements, if the tooth elements which are arranged spaced from one another in the peripheral direction of the roller are arranged as approximately trapezium-like plates which are fastened to the roller surface by their long base edges. As a result of their trapezoidal shape the plates can be stamped without loss from corresponding strips of sheet metal so that the associated manufacturing and material expense is extremely low. The trapezium-like plates can be welded to the roller surface at their long base side with, as seen in the axial direction of the roller, the weld bead being arranged on one half of the base edge on the front side of the plate and on the other half of the base edge on the reverse side of the plate. The weld bead is preferably deposited around the respective front and rear edges of the plate as seen in the direction of rotation around the trapezoidal plate. The arrangement of the weld bead on one half of one side of the plate and on one half of the other side of the plate produces a stress therebetween and contributes in this way to stiffening the plates in a favourable manner. The wedge-like gap which remains as a result of the curvature of the roller surface between the roller surface and the straight base edge of the trapezium-like plates is filled with metal during welding. Matching the base edge of the plates to the curvature of the roller is superflous.

Protection for the individual elements is claimed in respect of the levelling tools, the rotor-tiller, the tyned rake, the half rigid impact surface behind the rotor-tiller, the arrangement of the seed outlets and the construction of the crushing roller and also the arrangement of the tyne elements.

Preferred embodiments of the invention and also further advantageous features will now be explained in the following with reference to the figures which show:

FIG. 1 a partially sectioned view of a ground preparation machine in accordance with the invention and having a drilling device, FIG. 2 a plan view of the apparatus without the drilling device and without the crushing roller, FIG. 3 an axial view of a first embodiment fo a rotor-tiller for the ground preparation machine of the invention, FIG. 4 a partial view on a rotor-tiller in accordance with the arrow IV of FIG. 3.

Figure 6:
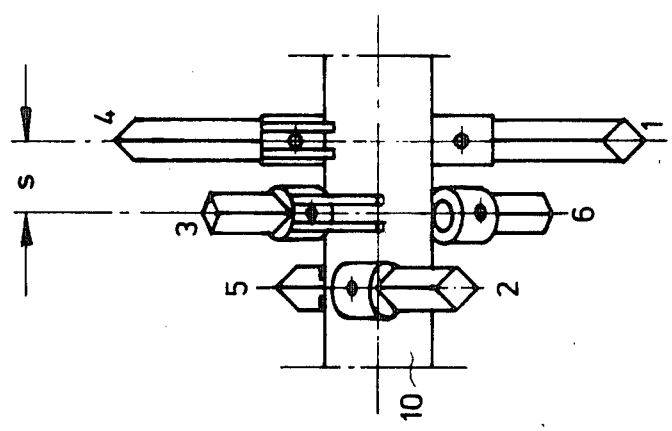
Figure 5:
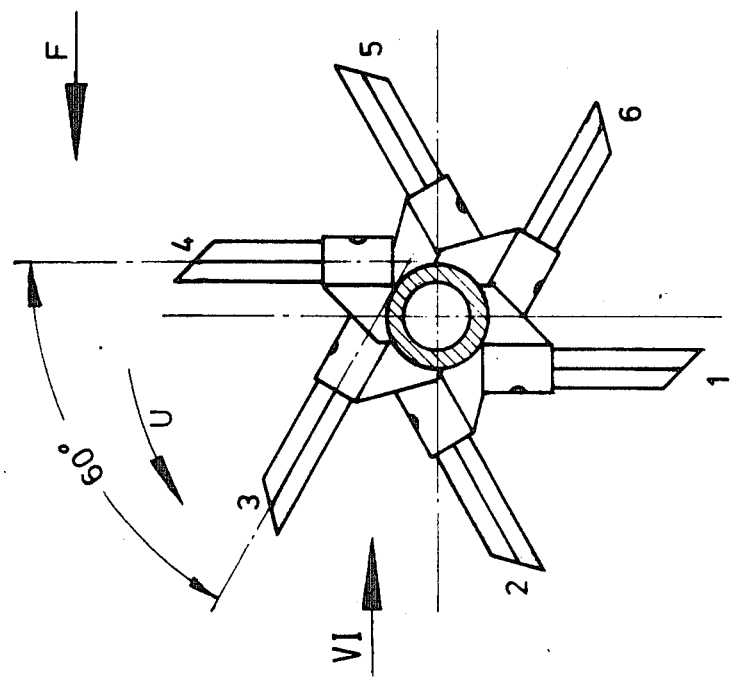
Figure 7:
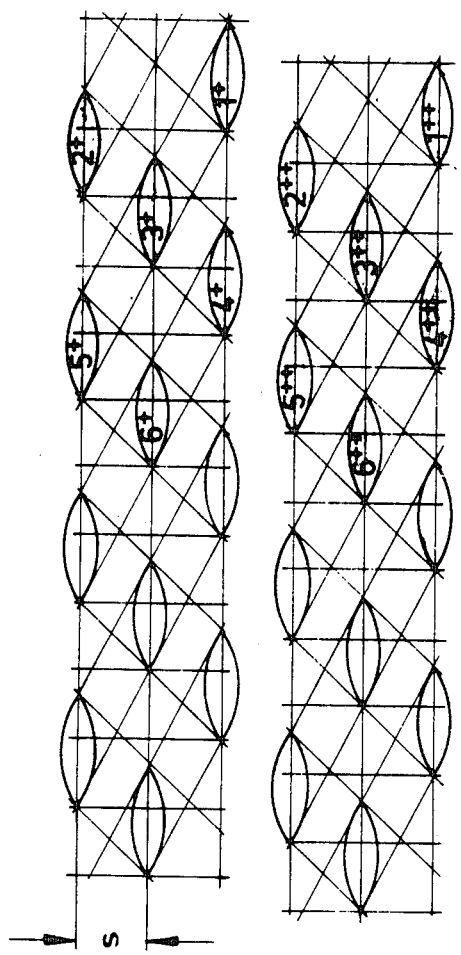
Figure 9:
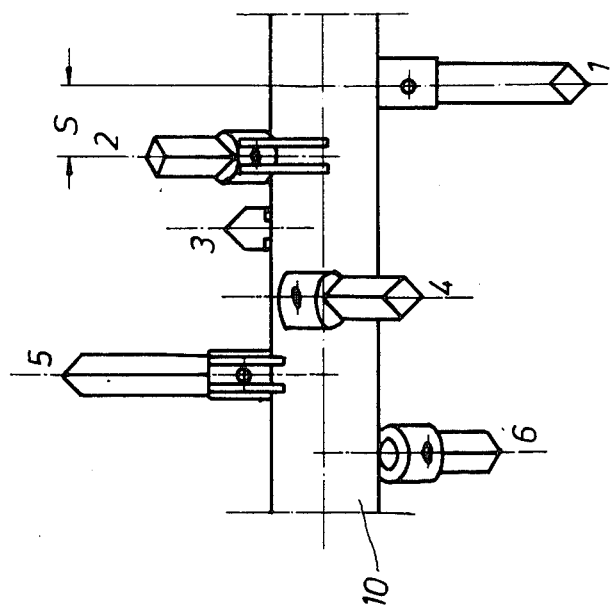
Figure 8:
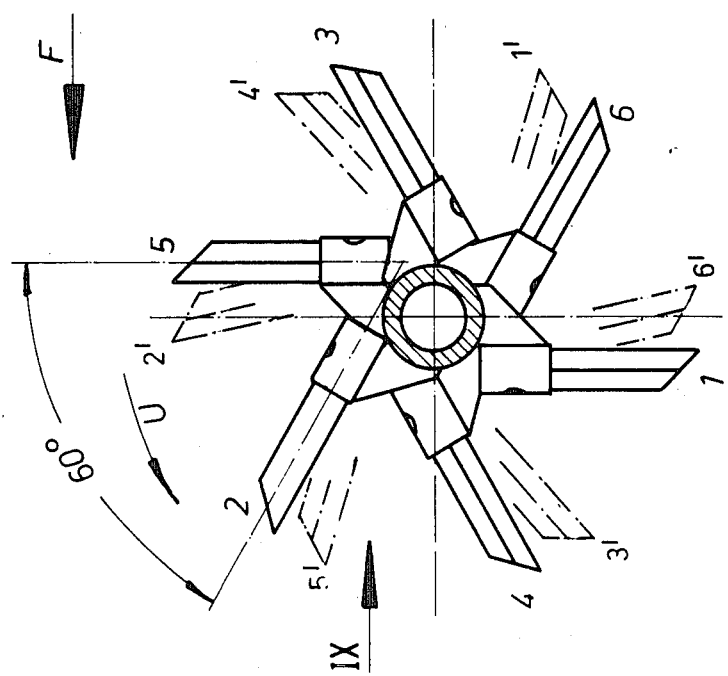
Figure 14:
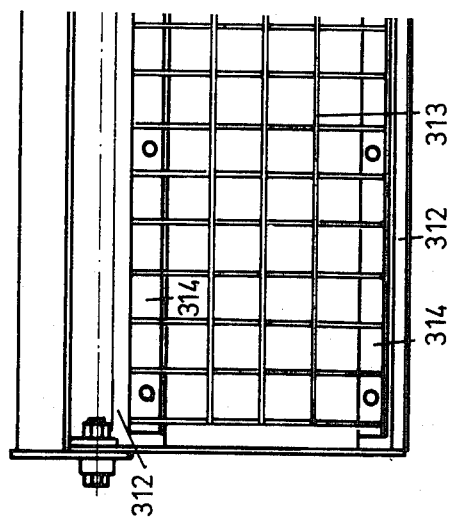
Figure 13:
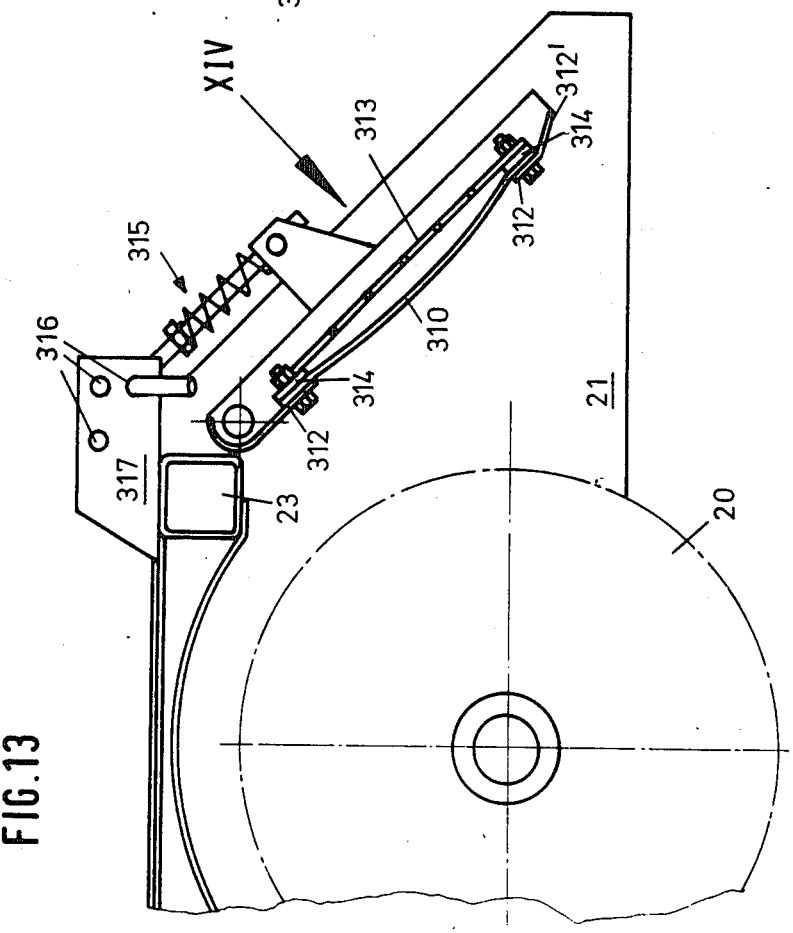
Figure 17:
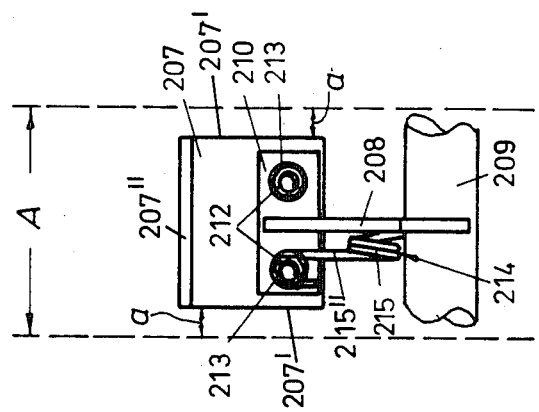
Figure 16:
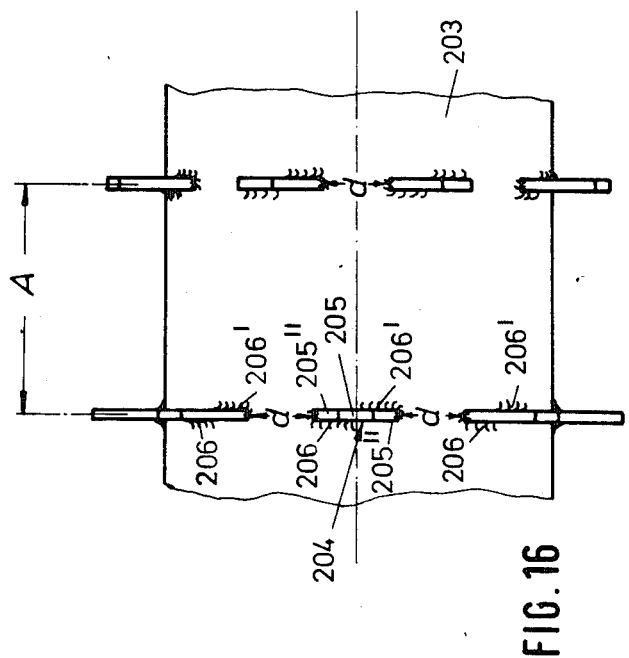

FIG. 5 a view corresponding to FIG. 3 of a second preferred embodiment,

FIG. 6 a partial view of this embodiment as seen in the direction of the arrow VI in FIG. 5, FIG. 7 the position of the ground contact points of the rotor-tiller of FIGS. 5 and 6 during operation of the ground preparation machine of the invention, FIG. 8 an axial view of a further embodiment of the rotor-tiller, FIG. 9 a plan view on a part of the rotor-tiller as seen in the direction of the arrow IX of FIG. 8, FIG. 10 an illustration corresponding to that of FIG. 7 for the rotor of FIGS. 8 and 9, FIG. 11 a sectional side view of the ground preparation machine of the invention with rotor and rake tynes, FIG. 12 a plan view, partially broken away, of the machine shown in FIG. 11, FIG. 13 a partially broken away side view of a part of a rotor-tiller with a semi-elastic impact surface arranged therebehind, FIG. 14 a plan view on the impact surface as seen in the direction of the arrow XIV in FIG. 13, FIG. 15 an axial view of the crushing roller, FIG. 16 a sectional plan view of the crushing roller as seen in the direction of the arrow XVI of FIG. 15, FIG. 17 a plan view of the scraper as seen in the direction of the arrow XVII of FIG. 15, FIG. 18 a detail of the auxiliary frame of the crushing roller and FIG. 19 the same auxiliary frame as shown in FIG. 18 however adjusted to a different vertical position.

The particularly preferred ground preparation machine illustrated in FIG. 1 has a frame 36 which is coupled by means of a three point suspension 37 which is known per set to a tractor vehicle 38 which is only schematically illustrated.

This frame carries a rotor-tiller 20 with levelling tools 107, which precede the rotor 20 in the direction of travel F, being arranged on the rotor housing 21.

A crushing roller 202 is arranged at pivots 50 on the frame 36 by means of an auxiliary frame 201. The auxiliary frame 201 is braced, if necessary resilient (springs not shown), against the frame 36 via a spindle 51.

The housing 21 of the rotor-tiller 20 is substantially closed, with the exception of the ground side and to the front and to the rear, and has a frame with transverse beams 22 and 23. The housing 21 is closed at the rear by a rake 24.

The rake tynes 25, which can each have a sawtooth-like front edge are pivotally mounted on links 26 which are pivotally arranged parallel to and alongside one another on a bar 27. The links 26 are coupled to an outrigger 28 which is pivotally fastened via a bar 58 to the frame 201 of the crushing roller 202. When the vertical position of the frame 201 of the crushing roller 202 is adjusted by means of the spindle 51 of the outrigger (lever) 28 is pivoted and takes with it the links 26 which are correspondingly adjusted together with the rake tynes 25 that are suspended therefrom so that the frontmost possible position of the rake tynes 25 is changed simultaneously. The range of pivotal movement of the rake tynes 25 is limited forwardly in the direction of travel F by their uppermost ends which abut against the rod 27 when the tynes are pivoted in the direction of travel. The actual lifting of the lowermost possible position of the rake tynes 25 preferably corresponds to one half of the lift of the crushing roller 202.

A mat 31, for example an armoured rubber mat, which contacts the rear sides of the tynes 25 and attempts by reason of its weight to pivot these tynes in the direction of travel is also fastened to the bar 27. At the sides the mat 31 terminates at the extended side panels 32 of the housing 21 so that a sealed joint is ensured at the side margins of the mat even when the mat is bent upwardly, for example when the tynes 25 push the mat 31 backwardly as a result of the ground resistance.

The rotor 20, which is preferably driven in a direction of rotation U which sustains the direction of travel F of the apparatus, rips open the ground in operation and thereby throws a part of the earth clods that are generated against the rakes 24 so that the clod pieces are shattered or cut by the blade-like rake tynes 25. The resulting crumbs are deflected downwardly by the mat 31 and swept to a flat surface.

A seed container 44 of a drilling device 45 is arranged on the transverse beams 22 and 23 of the rotor housing 21. The drilling device supplies measured quantities of seed to seed discharge mouth-pieces 47 via tubular conduits 46 which are flexible at least at their lower regions.

These mouth-pieces 47 are arranged on a mounting beam 100 which is arranged on arms 101 which can swing about pivots 102 arranged on the outrigger 28. In order to be able to adjust the vertical position of the mounting beam 100 the arms 101 are adjustably guided through sleeves 103 on levers 104 first ends of which are pivotally fastened to the pivots 102 and the other ends of which are biased by means of tension springs 105 towards the outrigger 28 so that the springs 105 try to pivot the arms 101 in the direction of travel F and so that the seed discharge mouth-pieces 47 are pushed forwardly in an approximately horizontal direction.

The frontmost position of the arms 101 and thus the seed discharge mouth-pieces 47 that is possible can be limited by abutments (not shown), for example on the pivots 102, these abutments can if necessary be adjustable.

It is however also possible for the mounting beam 100 to lie resiliently on the rear side of the mat 31 so that it follows the movement of the mat.

In the illustrated embodiment the mounting beam 100 is a substantially rigid four-sided section. A rigid mounting beam 100 is of advantage if the mounting beam is to be spaced from the mat 31 and not to be influenced by its movements.

If the mounting beam 100 is to contact the mat 31 it is useful to construct the mounting beam to be flexible in a horizontal direction, for example in the form of a flat strip which can locally yield on deflection of one of the rake tynes 25.

Levelling tools 107 are arranged on a transverse beam 110 on the frame 36 in the front of the rotor housing 21. The transverse beam 110 can be vertically adjusted but is however non-resiliently arranged on the frame 36. Plates 120 which each have an elongate slot 121 extending in a vertical direction and a round hole 122 are arranged on the transverse beam 110. An angled member 123 is attached to the frame 36. One surface of the angled member 123 extends parallel to the plate 120 and the other surface of the angled member engages around the side of the plate. A vertical row of holes (not visible) are located on the surface of the angled member 123 which is parallel to the plate 120 so that the plates 120 can be respectively screwed to the angled members by means of threaded bolts. One of the threaded bolts 124 is pushed through the elongate slot 121 and only needs to be released so that the plate and angled member can be displaced relative to one another to adjust the vertical position of the transverse beam 110. The other bolt which is in each case pushed through the round hole is completely removed in order to be able to move the beam 110 upwardly or downwardly until the round hole 122 is aligned with one of the holes of the row of holes in the angled member 123 so that the further threaded bolt can once again be inserted. As a result of the form-locked connection between the plate 120, the angled member 123 and the threaded bolts 124 the latter only need to be moderately tightened to securely anchor the transverse beam 110. In any event a secure and non-rotatable connection is ensured between the plates 120 and the angled members 123 and thus a secure and non-rotatable mounting of the transverse beam 110. An elongate slot extending in vertical direction can also be arranged in the angled member 123 in place of a series of holes so that a bolt can be inserted through this elongate slot and through the round hole 122 in the plate 120. For vertical adjustment it is then only necessary to lightly release the threaded bolts 124 which are inserted through the elongate slot 121 and the round hole 122 in the plates 120.

In order to simplify vertical adjustment an auxiliary device, such as an adjustment screw, can be attached between the plate 120 and the angled member 123.

Levelling plates 113 which are arranged by means of struts 112 on the transverse beam 110 serve as levelling tools 107. The levelling plates consist of plate-like members which are welded to the struts 112 over an area approximately at the plate centers. Shackles 114 serve to fasten the struts 112 to the transverse beam 110. As a result of the square profile of the shackles 114 and the square profile of the transverse beam 110 the shackles ensure a form-locked non-rotatable connection between the struts 112 and the transverse beam 110 even when the shackles 114 are only lightly tightened.

As can be seen from FIG. 2 in particular the levelling plates 113 are arranged on both sides of the wheel tracks S left by the tractor vehicle 38 and are inclined to the direction of travel F with the rear edges of the levelling plates 113 each being directed towards the wheel tracks S. In this manner the earth pushed to either side by the driving wheels of the tractor vehicle 38 is pushed again from both sides back into the wheel tracks S.

A central tool 107' consists of two levelling tools the levelling plates 113 of which are connected together in wedge-like form with a reinforcement or cutting blade 113 which is directed in the direction of travel F being arranged at the wedge apex.

A pusher plate 115 is, as shown in FIG. 2, arranged on the rotor housing 21 at the front on one side of the earth inlet. As seen in plan view the pusher plate 115 is arranged inclined to the direction of travel and guides earth to the earth inlet during movement of the apparatus by engagement with the earth surface. This pusher plate serves to protect a side cowling 43 which encloses a laterally arranged drive transmission for the rotor. This drive transmission is readily accessible as a result of this arrangement.

The rotor-tiller 21 has, as shown in FIGS. 3 and 4, teeth or prongs 1 to 4 arranged on a hollow rotor shaft 10. The teeth are exchangeably mounted in sockets 11 which are fastened in turn to the rotor shaft 10 by plates 12, 13. The teeth 1 to 4 are secured in the sockets 11 by securing bolts 14 which are passed transversely to the axis of the rotor shaft 10 and to the tooth axis through radial bores in the sockets 11 and a mating transverse bore in the teeth 1 to 4. As a result the teeth 1 to 4 are mounted so that the longitudinal axes of the teeth 1 to 4 are spaced from the axis of the rotor shaft 10 by a distance X. As can be seen from FIG. 4 in particular the teeth 1 to 4 have a square profile with the teeth being inserted into the sockets 11 so that one edge, which forms a wedge-like striker edge 15 points in the direction of rotation U.

In order to form points at their outer ends of the teeth 1 to 4 have end faces 16, which are here of rombic form as a result of the square cross-section of the teeth, which are inclined at an acute angle to the striker edges 15.

The teeth 1 to 4 are displaced from one another in the axial direction by a centerline to centerline distance S and are displaced in the peripheral direction U by an angle with the tooth 1 being displaced in the peripheral direction relative to the next tooth 2 in the axial direction by 180°, relative to the then next following tooth 3 by 90° and relative to the last booth 4 of the sequence in the axial direction by 270°.

Corresponding groups of teeth, which can be displaced relative to one another in the peripheral direction by any desired angle are multiply arranged on the rotor shaft 10.

The particularly preferred embodiment of the rotor-tiller shown in FIGS. 5 and 6 is distinguished from the construction illustrated in FIGS. 3 and 4 in particular by the fact that in each case two pairs of teeth 1 and 4, 3 and 6 and 2 and 5 are arranged diametrically opposite one another in a radial plane of the rotor shaft 10. The pairs of teeth 1 and 4, 3 and 6 and 2 and 5 which follow one another with a centerline to centerline distance S are displaced relative to one another in the peripheral direction by 60° in each case.

In this embodiment groups of teeth each comprising six teeth are thus arranged on the rotor shaft 10. In other respects the rotor-tiller of FIGS. 5 and 6 corresponds to the rotor-tiller illustrated by way of FIGS. 3 and 4.

When the rotor-tiller 20 illustrated in FIGS. 5 and 6 is moved over the earth surface with a speed of travel of circa 6 km/h and a speed of rotation of 300 rev./min. in a direction of rotation U which corresponds to the direction of travel F the teeth 1 to 6 contact the ground approximately every 18 cm on parallel lines as shown in FIG. 7. The ground contact points are designated with the numerals 1+ to 6+ in correspondence with the respective reference numerals of the teeth 1 to 6. If a further group of teeth is arranged on the rotor shaft 10 which is displaced relative to the first by for example 13° in the peripheral direction then the ground contact points 1++ to 6++ are simultaneously produced.

If the centerline to centerline spacing is ca. 6 cm one obtains a particularly uniform distribution of ground contact points. This distribution can be achieved with the rotor-tiller of FIGS. 5 and 6 even at a relatively low speed of revolution so that, on the one hand, the wear of the teeth is low and, on the other hand, the resistance of the ground to the teeth can be readily mastered.

If necessary the teeth can also be alternately inclined sideways to the one side or to the other so that radially opposite teeth contact the ground on different lines.

FIGS. 8 and 9 show a further advantageous embodiment of the rotor-tiller 20 which is particularly inexpensive to manufacture. FIG. 10 shows a illustration corresponding to that of FIG. 7 of the teeth tracks. The rotor-tiller 20 of FIGS. 8 and 9 has one or more groups of teeth each consisting of six teeth 1 to 6, 1' to 6' which are arranged displaced somewhat relative to one another in the peripheral direction as seen in the axial direction of the rotor-tiller. Each tooth 1 to 6 or 1' to 6' is arranged in a separate radial plane of the rotor-tiller 20 and is spaced from the next tooth in the axial direction by a distance S. The first three teeth 1 to 3 and 1' to 3' of a group of teeth are arranged helically relative to one another with sequentially following teeth respectively forming an angle of 120°. The same applied for the last three teeth 4 to 6 and 4' to 6' of a group of teeth. The third teeth 3 and 3' and fourth teeth 4 and 4' are in each case diametrically opposite to each other.

FIG. 10 shows that the rotor-tiller of FIGS. 9 and 10 also achieves a uniform working pattern despite the low number of teeth.

FIGS. 11 and 12 show the rotor housing 21 with a modified arrangement of the rake 24 when compared with FIG. 1. In this embodiment the rotatable bar 27 is braced by the outrigger 28 which is fixed thereto via an adjusting spindle 29 against an arm 30 fastened to the transverse beam 23.

The arrangement of the rake 24 is particularly advantageous for dry ground the clods of which are reliably broken up.

For moist or wet ground an arrangement in accordance with FIGS. 13 and 14 is preferred. In this arrangement the half rigid mat 310 which closes the rear end of the rotor housing is arranged behind the rotor-tiller 20 which is merely schematically illustrated. For this purpose pivotable retaining arms 311 are arranged on the transverse beam 23 and are connected together to form a frame by transverse battens (strips) 312. The lower transverse batten 312 has a somewhat rearwardly bent sweeping surface 312' which, if required sweeps over the ground prepared by the rotor-tiller. The mat 310 is fastened to the transverse battens 312 in overdimensioned form and thus forms an arch between transverse battens 312 which deforms on the impact of pieces of earth so that these do not remain adhered to the mat 310.

In the rearward direction the movability of the mat can be restricted by a grid 313. This grid is screwed to the transverse battens 312 by means of marginal strips 314 which sandwich the mat 310.

The inclined position of the frame consisting of the retaining arms 311 and the transverse battens 312 which holds the mat 310 can be adjusted by a spring support which can be inserted for this purpose in bores 316 in a plate 317 on the transverse beam 23.

It is also possible to rotationally fixedly arrange the retaining arms 311 on a part corresponding to the bar 27 of FIG. 1 which is pivoted in dependence on the vertical position of the crushing roller 202 so that the mat 310 adopts an inclined position dependent on the adjustment of the crushing roller 202.

The crushing roller which is more accurately illustrated in FIGS. 15 to 17 has a closed roller body 203 with tooth elements 204. The tooth elements 204 form rows of teeth which run in the peripheral direction around the roller body 203. The rows of teeth are spaced from one another in the axial direction of the roller body 203 by a distance A. Between successive tooth elements of a row of teeth there remains in each case an opening d the size of which corresponds approximately to the longitudinal extent of a tooth element 204 measured in the peripheral direction of the roller. The tooth elements 204 of neighbouring rows of teeth are displaced relative to one another in the peripheral direction in such a way, as seen in the axial direction of the roller, that behind a tooth element 204 of the one row of teeth there is in each case an opening between the tooth elements 204 of the other row of teeth.

The tooth elements 204 consist in each case of a trapezium-like plate 205 which is welded by its large base edge 205' to the surface of the roller body 203 and indeed, as can be seen from FIG. 16 in particular in each case by means of two weld beads 206 and 206' with the weld bead 206 being directed from the center of the base edge 205' of the trapeziumlike plate 205 along one side thereof and passing around one of the end edges 205" whereas the other weld bead 206' is arranged in corresponding manner on the side of the plate 205 and passes around the other end edge 205". This arrangement of the weld beads 206 and 206' puts a stress in the trapezium-like plates 205 and thus adds to its stiffness. The gaps present between the base edges 205' and the surface of the roller body are filled with material during welding and therefore the base edges 205' do not need to be matched to the curvature of the roller surface 203 before welding on the plates 205. A scraper 207 is in each case arranged between the rollers of tooth elements 204 with the width of the scraper 207 being smaller than the spacing A of the rollers of teeth so that in each case an intermediate space a remains between the side edges and the rows of teeth. The scrapers 207 lie in this arrangement only with their edges 207', which point in the direction of travel, in contact with the roller surface, preferably at an acute angle of incidence as shown in FIG. 15. It can also be seen from this figure that the scraper is arranged beneath the horizontal central plane of the roller. The scrapers 207 are held by retaining arms 208 which are in turn arranged on a preferably pivotable transverse member 209 of the roller frame 201 so that, if desired, the scrapers 207 can be pivoted in the direction of the arrow P away from the roller body 204. In order to fasten the scrapers 207 to the retaining arms 208 retaining plates 210, to which the scrapers are clamped by means of threaded bolts 211 and nuts 212 through the intermediary of washers 13, are connected in T-like form, for example by welding, to the retaining arms 208. A spring tyne element 214 which is formed by a coil spring 215 the end pieces 215' and 215" of which project beyond the peripheral surface of the coil in the radial direction is arranged in the direction of travel F behind each of the scrapers 207. The end 215' engages behind the crushing roller 202 in the earth surface and tears up the earth peeled by the scrapers 207 from the surface of the roller. The end piece 215" is bent into a U-shape and clamped between the washer 213 and the retaining plate 210 at one of the screwed connections between the retaining plate and one of the scrapers 207. The means for fastening the scrapers 207 to the retaining arms 208 thus also serve in part to secure the tyne elements 214.

Two tyne elements 214 can be arranged behind each scraper 207, in place of only one tyne element 214 as illustrated in FIG. 17, in accordance with the number of threaded connections between each scraper 207 and associated retaining plate 210. If necessary an even larger number of the spring tynes can also be arranged at each scraper.

Relatively wide scrapers 207 can be used with a correspondingly large spacing A of the rows of teeth as a result of the tyne elements 214. When compared with previous crushing rollers this spacing A can be at least doubled. Because the side edges 207' of the scrapers 207 also do not slide along the tooth elements 204 and because these tooth elements are arranged in relatively small numbers with openings D in the peripheral direction of the roller 202 the rolling resistance of the crushing roller 202 and also the frictional resistances caused by the scrapers 207 are comparatively small so that the crushing roller of the invention only requires low towing forces. At the same time, and in surprising manner, a particularly good working result is achieved without visible tracks being left by the tooth element 204 or the tyne elements 214.

The scrapers 207 which are relatively narrow in comparison to the spacing A of the rows of teeth free adherent earth in surprisingly effective manner from the roller body. This is also supplemented by the effect that earth engaged by the scrapers is pushed partially sideways to the rows of teeth so that the combination of the roller surface in the annular zone to the sides of the scrapers is also loosened.

The sharp edge form of the tooth elements ensures light penetration of the tooth elements into the ground.

FIGS. 18 and 19 show a preferred embodiment of the auxiliary frame 201 of the crushing roller 202. In this arrangement the scrapers 207 and the tyne elements 214 can be adjusted to a desired height relative to the roller axis independently of the vertical adjustment of the crushing roller 202 and its frame 201 relative to the frame 36. On the auxiliary frame 201 there is arranged an adjustable frame part 206 which is angle-like as seen in the axial direction of the roller 202 and which is adjustably braced on the frame 36 by means of the spindle 51. The adjustable frame part 216 is adjustably braced at different positions on the auxiliary frame 201 by means of two threaded bolts 217 in a curved elongate slot 218 the center of curvature of which coincides with the axis of the crushing roller 202 and by means of bracing struts 219 in which a row of holes 220 is arranged. Levers 22 which are pivotable about pivot points 221 are arranged on the adjustable frame part 216. The levers 22 are rotationally locked to a transverse member which is not visible (corresponding to 209 in FIG. 15) to which the scrapers 207 are fastened by means of the retaining arms 208. Curved elongate slots 223 the centers of curvature of which coincide with the pivot points 221 are arranged in the levers 222. The levers 222 can be clamped to the frame part 216 by means of screws 224 inserted into these elongate slots 223.

The adjustability of the frame part 216 serves for vertical adjustment of the scrapers 207 and the spring tynes 214. The adjustability of the levers 222 serves to position the scrapers 207 so that they contact the roller body 203.

FIGS. 18 and 19 show two vertical adjustments C of the crushing roller 202. The height B of the scrapers 207 and the spring tynes 214 is in both cases set at the same value. In this way the desired optimum dropping height for the earth peeled from the roller body 203 by the scrapers can thus be achieved for every vertical position of the crushing roller 202; in the same way as the desired optimum working depth of the tyne elements 214.

In use the illustrated devices are supported on the crushing roller 202 the vertical adjustment of which relative to the frame 36 determines the working depth of the ground preparation tools. In use the devices are vertically adjustably coupled in the "floating position" to the tractor vehicle 38.

We claim:

1. A power take-off soil tilling machine having a frame that can be coupled, in a vertically adjustable manner by a three-point suspension to a pulling vehicle carrying the soil tilling machine, and having stationary soil tilling tools that are exchangeably disposed in the driving direction on said frame in front of a power take-off-driven pronged rotor-tiller, and having a cover disposed behind the pronged rotor-tiller which directs piled-up soil to the soil surface, as well as having a crumbler roller that is vertically adjustably arranged behind the cover and has an essentially closed circumferential surface and toothed elements arranged in rows in circumferential direction, characterized in that vertically adjustable levelling tools are arranged as stationary soil tilling tools on both side of the track grooves left by the pulling vehicle, with said levelling tools seeking to push soil into the track grooves by means of leveling plates that are aligned essentially parallel to the vertical axis of the machine, are diagonal with respect to the driving direction and with their rear end pieces point into the track grooves;

that the pronged rotor-tiller is arranged at the frame by means of rotor gearing fixed to the frame, can be driven in circumferential direction in the driving direction, and has several groups of teeth each comprising six teeth which are arranged somewhat displaced from each other in the peripheral direction and the teeth of which each have a striker edge of wedge-like cross-section which is directed in the direction of rotation and of which are in each case arranged in a separate radial plane of the rotor-tiller with the first three and the last three teeth of a group of teeth being arranged in each case in a helical line with an angle of approximately 120° between sequential teeth and with a third and fourth teeth of a group of teeth lying diametrically opposite to one another as seen in the axial direction of the rotor-tiller;

that the cover is movably and with mutually movable parts arranged behind the pronged rotor;

that the crumbler roller is disposed at the frame on joints by means of a subframe; and that strippers are arranged between toothed elements at a distance from said elements, with combing means disposed behind said strippers by means of springy ends for reaching into the soil surface.

2. A power take-off soil tilling maching having a frame that can be coupled, in a vertically adjustable manner by a three-point suspension to a pulling vehicle carrying the soil tilling machine, and having stationary soil tilling tools that are exchangeably disposed in the driving direction on said frame in front of a power take-off-driven pronged rotor-tiller, and having a cover disposed behind the pronged rotor-tiller which directs piled-up soil to the soil surface, as well as having a crumbler roller that is vertically adjustably arranged behind the cover and has an essentially closed circumferential surface and toothed elements arranged in rows in circumferential direction, characterized in that vertically adjustable levelling tools are arranged as stationary soil tilling tools on both sides of the track grooves left by the pulling vehicle, with said leveling tools seeking to push soil into the track grooves by means of leveling plates that are aligned essentially parallel to the vertical axis of the machine, are diagonal with respect to the driving direction and with their rear end pieces point into the track grooves;

that the pronged rotor-tiller is arranged at the frame by means of rotor gearing fixed to the frame, can be driven in circumferential direction in the driving direction;

that the cover is movably and with mutually movable parts arranged behind the pronged rotor-tiller;

that a rake with blade-like rake tynes is arranged to further comminute earth clod pieces as left by the rotor-tiller with the rake tynes being pivotally suspended and yielding to the resistance of the ground and being loaded at their rear sides by means of a mat which at least partially covers the rear sides of the rake tynes;

that the crumbler roller is disposed at the frame on joints by means of a subframe; and that strippers are arranged between toothed elements at a distance from said elements, with combing means disposed behind said strippers by means of springy ends for reaching into the soil surface.

3. A ground preparation machine in accordance with claim 2 and characterized in that the rake is arranged on the housing of the rotor-tiller as a housing rear wall and impact surface for the earth clod pieces thrown up from the rotor-tiller.

4. A ground preparation machine in accordance with claim 2 and characterized in that the rake tynes have sawtooth-like leading edges.

5. A ground preparation machine in accordance with claim 2 and characterized in that the rake tynes are arranged displaced in zig-zag-like form relative to one another as seen in plan view.

6. A ground preparation machine in accordance with claim 2 and characterized in that the pivotal range of the rake teeth in the direction of travel of the ground preparation machine is limited by an adjustable abutment.

7. A ground preparation machine with a rotor-tiller and at least one of a rake and a flexible impact surface arranged therebehind, in particular in accordance with claim 2 and characterized in that at least one speed dispensing mouthpiece of a drilling device is arranged behind the rake or the impact surface on a mounting beam which is suspended for movement in the horizontal direction.

8. A ground preparation machine in accordance with claim 7 and characterized in that at least said mounting beam is vertically adjustable.

9. A ground preparation machine in accordance with claim 7 and characterized in that a horizontally movable mounting beam is constructed as a strip which is substantially flexible in the horizontal direction and which can lie against at least one of the rear side of the rake tynes, the mat and the impact surface.

10. A ground preparation machine in accordance with claim 7 and characterized in that the horizontally movable mounting beam is substantially rigid.

11. A ground preparation machine in accordance with claim 7 and characterized in that the mounting beam is horizontally movable and adjustably mounted spaced apart from at least one of the rear side of the rake tynes, the mat and the impact surface.

12. A ground preparation machine in accordance with claim 7 and characterized in that the mounting beam is arranged on pivoted arms.

13. A ground preparation machine in accordance with claim 7 and characterized in that the mounting beam is acted on by a spring device which tries to push a seed dispensing mouthpiece against the ground resistance in the direction of travel.

14. A ground preparation machine in accordance with claim 2 and characterized in that for the greatest working depth of the rake, at least one of the vertical adjustment of an impact surface and a vertical adjustment of a seed dispensing mouthpiece is coupled to the vertical adjustment of the crumbler roller.

15. A power take-off soil tilling machine having a frame that can be coupled, in a vertically adjustable manner by a three-point suspension to a pulling vehicle carrying the soil tilling machine, and having stationary soil tilling tools that are exchangeably disposed in the driving direction on said frame in front of a power take-off-driven pronged rotor-tiller, and having a cover disposed behind the pronged rotor-tiller which directs piled-up soil to the soil surface, as well as having a crumbler roller that is vertically adjustably arranged behind the cover and has an essentially closed circumferential surface and toothed elements arranged in rows in circumferential direction, characterized in that vertically adjustable levelling tools are arranged as stationary soil tilling tools on both sides of the track grooves left by the pulling vehicle, with said leveling tools seeking to push soil into the track grooves by means of leveling plates that are aligned essentially parallel to the vertical axis of the machine, are diagonal with respect to the driving direction and with their rear end pieces point into the track grooves;

that the pronged rotor-tiller is arranged at the frame by means of rotor gearing fixed to the frame, can be driven in circumferential direcion in the driving direction;

that the cover is movably and with mutually movable parts arranged behind the pronged rotor-tiller;

that the crumbler roller is disposed at the frame on joints by means of a subframe and has rows of teeth elements aligned in the peripheral direction on at least one of a peripherally closed and substantially closed roller body with scrapers contacting the roller body at an acute angle of incidence between the rows of teeth, the teeth elements being arranged as substantially trapezum-like plates which are each fastened to the roller surface by their long base edge, the trapezum-like plates each being welded to the roller surface by their long base edge with the weld bead as seen in the axial direction of the roller, being arranged on one half of the base edge on the front side and on the other half of the base edge on the reverse side of the plate and being deposited on the roller surface around the end edges of the plate which face in the direction of rotation of the roller and against the direction of rotation of the roller respectively; and that strippers are arranged between toothed elements at a distance from said elements, with combing means disposed behind said strippers by means of springy end for reaching into the soil surface.

* * * * *